Jan. 18, 1955 W. I. WHITE 2,699,957
DRAFT DEVICE PERMITTING PLURAL MOVEMENTS
Filed Oct. 7, 1949 2 Sheets-Sheet 1
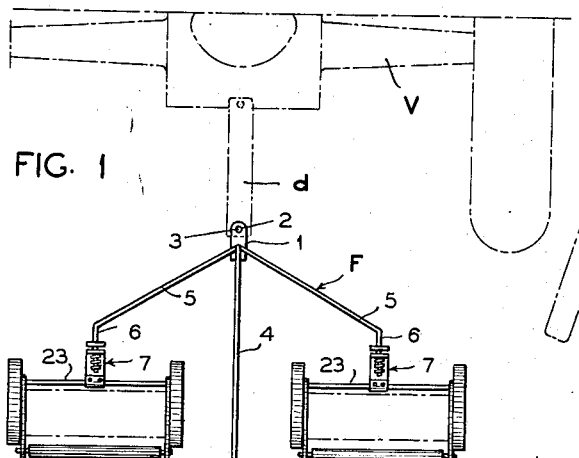
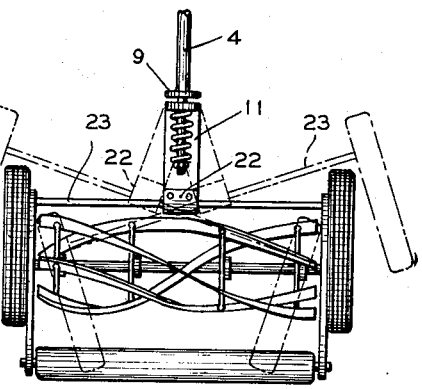
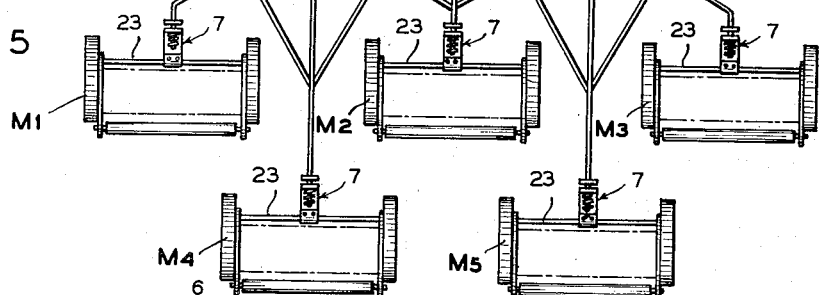
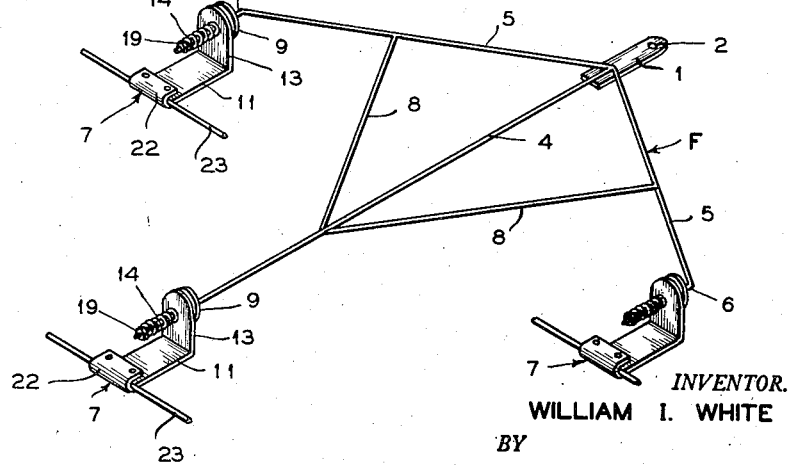
INVENTOR.
WILLIAM I. WHITE
BY
*Sol Shapiro*
ATTORNEY Jan. 18, 1955     W. I. WHITE     2,699,957
DRAFT DEVICE PERMITTING PLURAL MOVEMENTS
Filed Oct. 7, 1949     2 Sheets-Sheet 2

INVENTOR.
WILLIAM I. WHITE
BY
Sol Shapsirio
ATTORNEY

United States Patent Office 2,699,957
Patented Jan. 18, 1955

2,699,957

DRAFT DEVICE PERMITTING PLURAL MOVEMENTS

William I. White, Baltimore, Md.

Application October 7, 1949, Serial No. 120,049

4 Claims. (Cl. 280—485)

This invention relates to lawn mowers and particularly to a device which enables lawn mowers of conventional design to be effectively attached to any propelling vehicle such as a tractor and used either simply or in gang units of any desired number.

A number of devices for use of lawn mowers in gang units, have been proposed in the art. Many of them require complex frames and attaching means. In some of them freedom of movement of the individual mowers has been sacrificed. Still other disadvantages are exhibited in many of such prior art devices. Among the objects of the present invention is the provision of relatively simple and economic means enabling lawn mowers of conventional type to be readily attached to a propelling vehicle.

Other objects include such means which retain desired freedom of movement in the mowers.

Still other objects include such means enabling either one mower or a series of mowers to be used simultaneously.

Still further objects and advantages of the present invention will appear from the more detailed description set forth below, it being understood that such more detailed description is given by way of illustration and explanation only, and not by way of limitation, since various changes therein may be made by those skilled in the art, without departing from the scope and spirit of the present invention.

Figure 6:
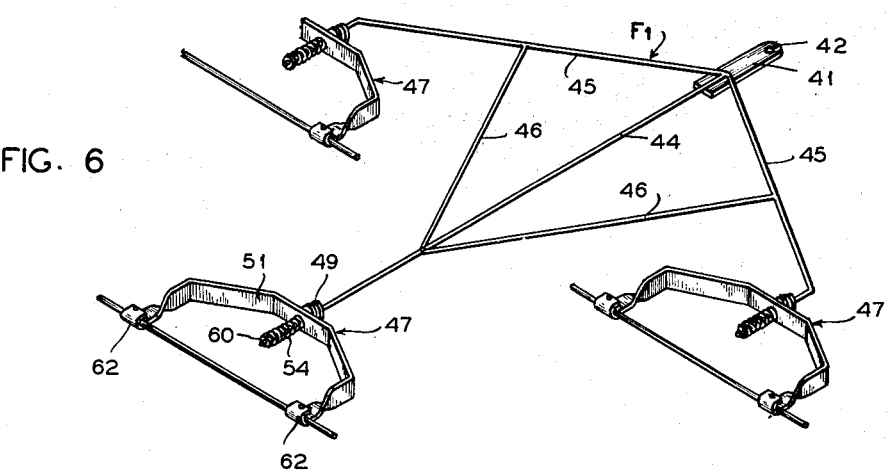
Figure 3:
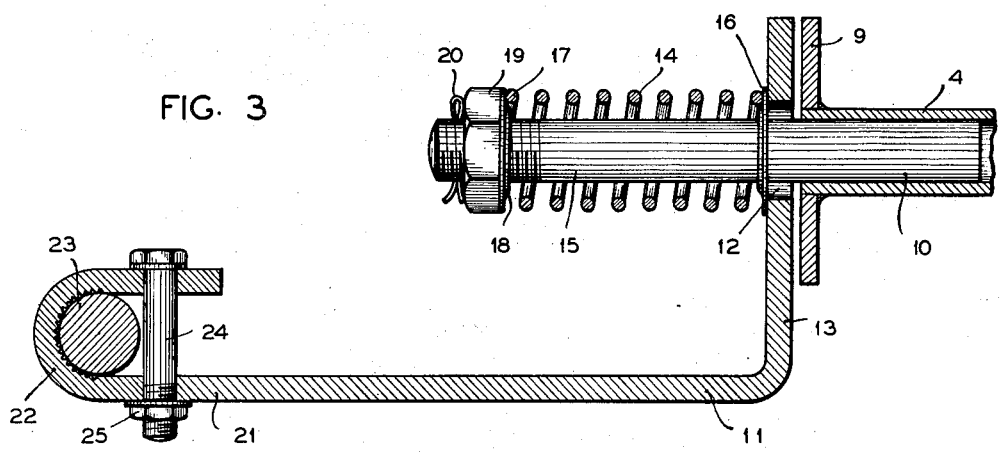
Figure 7:
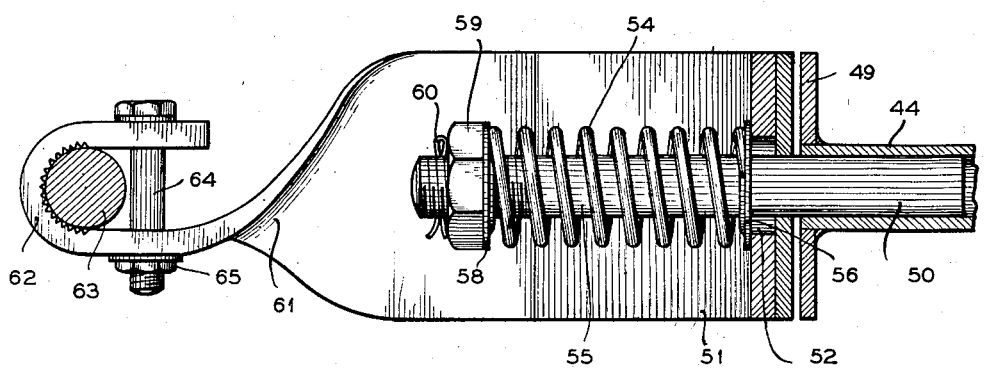

In connection with that more detailed description there is shown in the accompanying drawings, in Figure 1, a plan view of a series of mowers and the bracket used, with a diagrammatic showing of a propelling vehicle; in Figure 2, a perspective view of one form of bracket; in Figure 3, a vertical section through the attachment means of the bracket of Figure 2; in Figure 4, a plan view of the attachment means applied to a single mower; in Figure 5, a plan view of a large series of mowers and bracket; in Figure 6, a perspective view of a modified form of bracket; and in Figure 7, a vertical section through the attachment means of the bracket of Figure 6.

In accordance with the present invention, bracket means are provided for attaching one or more lawn mowers of conventional type, i. e. rotary mowers, to a propelling vehicle such as a tractor, the bracket means being simple but effective, and retaining the desired freedom of movement of the lawn mowers regardless of the number of such mowers used at any one time, each mower being movable independently of every other to accommodate itself to ground undulations and minor obstacles, etc.

Referring to the drawings, as shown in Figure 1, a propelling vehicle V has the usual draft means $d$ to which the bracket of the present invention is attached by strap 1 having an opening 2 through which a pin 3 extends. It will be apparent that since the bracket is attached by this simple means to the vehicle V, and no other attachment is used between the bracket and vehicle, the bracket is free to move as may be necessary and a very flexible attachment is obtained. A framework F is carried by the strap 1, the structure of the framework being variable and dependent on the particular arrangement of mowers desired and the number of them to be used.

As shown in Figure 1 where three movers are illustrated, a central arm 4 and two side arms 5, 5 radiate from strap 1, to which they are attached rigidly, the side arms having angularly directed ends 6, 6 ending short of the arm 4, each of the arms carrying attachment means 7 for attachment to a mower element. The central arm 4 and side arms 5, 5 will thus position three mowers in the desired way so that their cuts are in juxtaposition and slightly overlapping. Of course, any arrangement may be used as desired. In Figure 2, bracing arms 8, 8 are shown between the central arm 4 and the side arms 5, 5, the frame F otherwise being the same as described above for Figure 1.

Each attachment means 7 comprises the following structure. The end of each arm 4 and 5, 5, as shown particularly in Figure 3 carries a peripheral flange 9 welded thereto while a rod 10 attached to arm 4 for example, extends therefrom beyond the flange 9. Desirably the frame is made of tubular construction, so that a rod 10 may be welded within the end of each arm 4 and 5, 5 and extend outwardly beyond the flange 9. A right-angle strap 11 is provided having an opening 12 in one end 13 which opening 12 is substantially larger than the cross section of the rod 10 so that substantial movement of the strap 11 about the rod 10 will be possible including rotation about rod 10 through an angle of 360°, or any fraction thereof. To maintain the strap 11 in position, a strong coil spring 14 which surrounds the outer end 15 of the rod 10, is provided seating at its inner end against the abutment provided by washer 16 and end 13 of strap 11, and seating at its outer end 17 against washer 18 in contact with nut 19 threaded on the end of rod 10. A lock pin 20 passing through a perforation in rod 10, may be used to lock the nut in position. A series of perforations in rod 10 may be provided if desired to supply varying positions to control the pressure of the spring 14 against the strap end 13, but they are not necessary, a single position being sufficient in which the pressure of the spring 14 holds the strap in position against the flange 9 to maintain it in normal position, but nevertheless permits fluctuation of position about the rod 10 thus permitting movement of the mower, as further explained below. The outer end 21 of the strap 11 is provided with means to attach a mower. As shown the end 21 of strap 11 may be formed as a clevis 22 within which the front bar 23 of a lawn mower may be received and held by bolt 24 carried in the clevis 22 and rigidly secured by nut 25.

As illustrated in Figure 4, the arrangement herein shown permits all desired freedom of movement of the mower. A single mower is shown in this figure attached by means as described above for Figures 1 to 3. The dotted lines show different positions that may be assumed by the mower due to undulations in the ground over which the mower is propelled. The mower may move up or down or sidewise in any direction since the mounting virtually acts as a universal joint. As soon as protuberance, or obstruction or obstacle is passed, the snubbing action of the spring returns the mower to normal position. The opening in the end of the strap 11 enables this movement of the strap with respect to the bolt 10 on the frame F to take place. Similarly in changing direction as in turning corners, any necessary adjustment in position takes place temporarily until the movement is completed. What has been set forth for the one mower shown in Figure 4 applies to each mower regardless of how many are present, since each is mounted on the frame in the same way.

The frame may be varied as desired to accommodate any number of mowers that may be positioned in any arrangement with respect to each other. Figure 4 will serve to show how a single mower may be mounted and used. In Figures 1 and 2, three mowers are shown. Figure 5 illustrates one arrangement of five mowers used in a gang in which the frame F is made up of arms rigidly joined together to provide two groups of alined mowers, a first group of three mowers $M_1$, $M_2$, and $M_3$ and a second group $M_4$ and $M_5$ spaced rearwardly of the first group and positioned to cut between the mowers $M_1$, $M_2$, and $M_3$, but with some overlapping of area mowed so that a continuous wide band is mowed at one time. The number and positioning of the mowers may therefore be varied at will. In all cases however, there will be a rigid frame having a single point of attachment of the frame to the propelling vehicle, and one individual arm on the frame to which individual arm each mower is individually attached desirably by the flexible mountings shown and described herein. In such structures, maximum effective movement of mowers is obtained with the greatest simplicity of structure.

The means used for attaching the bracket to the mowers may be standardized for use with a variety of mowers of different types all of which however show a front bar on which the clevis or equivalent attaching means may be placed. Or the attaching means may be varied to suit any particular type, style, or structure of mower. One such variation is illustrated in Figures 6 and 7. As shown in Figure 6, a frame F' having the attaching strap 41 and perforation 42 has a central arm 44 and side arms 45, 45, with bracing arms 46, 46, each of the arms carrying an attaching means 47. The frame F' is rigid and the relation of these parts to each other is the same as described above for Figure 2. Arm 44 is illustrated in Figure 7, carrying peripheral flange 49 welded thereto, while rod 50 attached to arm 44 for example extends therefrom beyond flange 49. A yoke 51 is provided having an opening 52 intermediate the ends of the yoke which opening is substantially larger than the cross section of rod 50 so that, as in Figures 1 to 4, substantial movement of the yoke 51 and rod 50 will be possible. To maintain the yoke 51 in position, a strong coil spring 54 surrounding the end 55 of rod 50 is provided seating against washer 56 and yoke 51 at its inner end, and against washer 58 and nut 59 at its outer end with lock pin 60, the structure and arrangement of these parts corresponding with similar elements described above for Figure 3.

The yoke 51 is turned on itself through an angle of 90° as shown at 61, adjacent each end, to provide a clevis 62 adapted to embrace the front bar 63 of a mower and held in position thereon by bolt 64 and nut 65. It should be noted that in this structure there will be a pair of clevises or other attaching means 62, 62 on each yoke 51 so that a modified form of attaching means is thus provided. However each mower carries its individual mounting on its individual arm of the frame F so that the structure functions in a manner analogous to that set forth above for Figures 1 to 5.

The present invention therefore supplies a simple and economic structure which effectively provides for propelling a gang of lawn mowers of conventional rotary or analogous type, giving a flexible mounting which enables each mower to function individually and adjust itself to ground undulations and changes of direction. A further unique function of this invention is that each mower may be inverted by being turned upside down on its mounting so that it, or a gang of such mowers, may be towed out of gear.

Having thus set forth my invention, I claim:

1. A bracket for attaching one or more lawn mowers to a propelling vehicle, which comprises a tubular supporting arm for attachment to the vehicle, a flange at the end of said arm, a rod rigidly mounted in said arm which rod extends beyond said flange, an angular shaped flat strap having a vertical portion in face-to-face relation with said flange and an outwardly extending portion for attachment to the mower, said vertical portion of said strap having an opening substantially larger than the cross-section of said rod through which said rod is inserted to permit said strap to rotate about said rod and to invert the mower for towing out of gear or for towing the mower in gear when cutting, abutment means at the extending portion of said rod to maintain said vertical portion of said strap in face-to-face relation with said flange and attchment means at the end of said extending portion to secure the front bar of the mower.

2. A bracket as set forth in claim 1 wherein a coil spring is mounted on said rod between said vertical portion of said strap and the abutment means at the outer end of said rod to maintain said vertical portion yieldingly in face to face position with said flange.

3. A bracket as set forth in claim 1 wherein said attachment means is a clevis.

4. A bracket as set forth in claim 1 wherein the strap is a yoke member having a clevis at each end for attachment to the front bar of the mower.

References Cited in the file of this patent

UNITED STATES PATENTS

| Number | Name | Date |
|---|---|---|
| 1,366,948 | Ross | Feb. 1, 1921 |
| 1,408,081 | Deems | Feb. 28, 1922 |
| 1,499,859 | Deems | July 1, 1924 |
| 1,535,891 | Arndt | Apr. 28, 1925 |
| 1,939,830 | Paul | Dec. 19, 1933 |
| 2,111,016 | Worthington | Mar. 15, 1938 |
| 2,384,363 | Bingham | Sept. 4, 1945 |
| 2,550,083 | Pazdernik | Apr. 24, 1951 |

FOREIGN PATENTS

| Number | Country | Date |
|---|---|---|
| 230,654 | Great Britain | Mar. 19, 1925 |